2,809,998
Patented Oct. 15, 1957

2,809,998

ARYL (ARYLCYCLOHEXYL) CYCLOHEXANOL COMPOUNDS AND A METHOD OF PREPARING SAID COMPOUNDS

Robert E. Miller, Dayton, Ohio, assignor to Monsanto Chemical Company, St. Louis, Mo., a corporation of Delaware No Drawing. Application November 14, 1955, Serial No. 546,816

4 Claims. (Cl. 260—618)

This invention relates to certain new compounds and to a method of preparing these compounds.

The new compounds of my invention are aryl-$\alpha$-(arylcyclohexyl) cyclohexanols.

The new compounds of my invention are produced by novel condensation reactions of secondary aryl cyclohexanols.

The preparation of my new compounds is illustrated by the following non-limiting examples.

Example 1

A mixture containing 592 grams of 2-phenylcyclohexanol, 27.7 grams of tripotassium phosphate and 11.4 grams of a mixture of 1:1 copper chromite-nickel catalyst was refluxed at 210–225° C. at atmospheric pressure for 10 hours. The water removed azeotropically amounted to 7 cc. The reaction mixture was filtered, washed with water, taken up in ether and dried. Upon distillation 25 grams of 2-phenyl-6-(2'-phenylcyclohexyl)cyclohexanol, B. P. 195–210° C./9 mm., $n_D^{25}$ 1.5661 was obtained. This is a conversion of 4.4 percent and a 37.5 percent yield.

*Analysis.*—Calcd. for $C_{24}H_{30}O$: C, 86.15; H, 9.02. Found: C, 85.65; H, 8.53.

Example 2

A mixture of 499 grams of 2-phenylcyclohexanol, 26.5 grams tripotassium phosphate and 10 grams copper chromite-nickel catalyst was heated at 254–264° C. for 15 hours. Distillation gave 20.5 grams of 2-phenyl-6-(2'-phenylcyclohexyl)cyclohexanol, B. P. 199–210° C./4 mm. The conversion is 4.2 percent and the yield is 16.4 percent.

*Analysis.*—Calcd. for $C_{24}H_{30}O$: C, 86.15; H, 9.02 Found: C, 86.42; H, 7.70.

The fact that the recorded distillation pressure in the two examples differs with no corresponding difference in distillation temperature is attributed to inherent inaccuracy of the manometer in measuring the true pressure in the distillation system.

The 2-phenyl-6 - (2' - phenylcyclohexyl)cyclohexanol showed microbiological activity, being active at a dilution of one to one-thousand against *Aspergillus niger*. This compound was also effective as an agricultural fungicide, giving excellent results against tomato wilt in systemic tests at a dilution of the compound of 100 parts per million.

The microbiological activity was determined by dissolving 0.2 gram of the compound in 5 ml. acetone, adding the resulting solution to 95 ml. of water containing 5 grams of Ivory Snow, and diluting this solution in agar test media to obtain a one to 1000 dilution of the compound. The growth of *Aspergillus niger* was inhibited in the test media containing one thousandth part of the compound.

The solution for the tomato wilt test was prepared by dissolving 100 mg. of the compound in 1 ml. of a surface active agent, "Tween 20," and diluting to the 100 parts per million concentration. Four or five weeks old tomato plants were treated on three successive days with 30 ml. of the solution per pot. On the fourth day, the plants were inoculated with *Fusarium lycopersici* by uprooting and immersing in a suspension of *Fusarium lycopersici* for thirty seconds, and were then replanted. When control plants showed marked disease symptoms, the treated plants were compared with the controls, and the extent of disease in the plants was determined by accepted methods. "Tween 20" is a proprietary surface active agent which is a sorbitan monolaurate polyethylene oxide condensate.

In my condensation of arylcyclohexanols, any arylcyclohexanols can be used, so long as they do not contain substituents which interfere with the reaction, or which are readily hydrolyzed or otherwise affected by the reaction conditions to give undesired products. It is preferred that the arylcyclohexanols contain only hydrocarbon substituents. The aryl group or groups can be on the 2-, 3-, 4- or 5-positions of the cyclo-hexanol; for the Guerbet reaction, it is necessary that there be a methylene group (—$CH_2$—) connected to the carbinol carbon atom, so the 6-position (or alternatively the 2-position) must be free of substituents. The secondary arylcyclohexanols containing a methylene group attached to the carbinol carbon atom can have alkyl substituents on the aryl radical or upon the cyclohexanol ring. Such alkyl substituents as methyl, ethyl, propyl, isopropyl, n-butyl, isobutyl, sec.-butyl, tert.-butyl, n-amyl, isoamyl, hexyl, cyclohexyl, and decyl, etc., radicals, or aralkyl radicals such as benzyl can be present on the aryl radical or the cyclohexanol ring. "An aryl" radical is meant to include phenyl, naphthyl, etc., and also to include substituted aryls, such as alkaryl radicals. However, a phenyl radical is preferred. The conversion of 3-, 4-, or 5-arylcyclohexanols is easier than that of 2-arycyclohexanols, probably because of steric hindrance encountered with the latter compounds.

The following specific arylcyclohexanols are representative of the arylcyclohexanols which can be used in the condensation procedure: 3-phenylcyclohexanol, 4-phenylcyclohexanol, 2 - (1' - naphthyl)cyclohexanol, 3 - (2'-naphthyl)cyclohexanol, 2-propyl-3 - phenylcyclohexanol, 2,2-dimethyl-4 - (para-ethylphenyl) - cyclohexanol, 2,5-diphenylcyclohexanol, 2-phenyl-4 - decylcyclohexanol, 2-phenyl-5-cyclohexylcyclohexanol, 3-butyl-4 - phenylcyclohexanol, 2-(ortho-methylphenyl) cyclohexanol, 3 - (meta-hexylphenyl)cyclohexanol. The cyclohexanols may be condensed individually, or any two or more of the foregoing or other arylcyclohexanols can be condensed together to give mixtures of various products. Mixed products can also be produced when both the 2- and 6-positions of the cyclohexanol are free of substituents.

The new compounds of my invention includes aryl-$\alpha$-(arylcyclohexyl) secondary cyclohexanols in which the aryl and arylcyclohexyl radicals and the cyclohexanols can contain any of the substituents set forth above. Novel aryl-$\alpha$-(arylcyclohexyl)-cyclohexanols are produced by the condensation of any of the foregoing arylcyclohexanols, individually or as mixtures, or by the condensation of any other arylcyclohexanols. The aryl radical in my new compounds can be a phenyl radical, or any other aryl radical, e. g., naphthyl, anthryl, etc. It is preferred that the aryl radical be a phenyl radical, and it is further preferred that it be on the 2-position of the cyclohexanol and the 2'-position of the cyclohexyl radical; however, aryl radicals can be on the 3-, 4-, or 5-positions of the respective cyclohexyl rings. The following compounds are representative of the new compounds of my invention, although it is obvious that other embodiments of my invention can be prepared, which vary in the number, type and position of substituents by condensing certain of the foregoing aryl cyclohexanols, or other arylcyclohexanols. Examples of new compounds are: 2-phenyl-6-(2'-phenylcyclohexyl)cyclohexanol, 3-phenyl - 6 - (3' - phenylcyclohexyl)cyclohexanol, 4-phenyl-2-(4' - phenylcyclohexyl)-cyclohexanol, 2-α-naphthyl-6-(2'-α-napththylcyclohexyl)-cyclohexanol, 3 - ortho - methylphenyl - 6 - (3' - ortho-methylphenylcyclohexyl)cyclohexanol, 4 - para - decylphenyl - 2 - (4' - para - decylphenylcyclohexyl)cyclohexanol, and 2-phenyl - 4 - cyclohexyl - 6 - (2' - phenyl - 4'-cyclohexylcyclohexyl)cyclohexanol. The compounds have substituents on corresponding positions of the cyclohexyl or aryl rings, as can be the case when a single compound condenses with itself; or, the substituents can be on non-corresponding positions, for example, one of the products from the condensation of 2-phenyl-cyclohexanol with 3-phenylcyclohexanol is 2-phenyl-6-(3'-phenylcyclohexyl)cyclohexanol.

Although other substituents can be present, the aryl-α-(arylcyclohexyl)cyclohexanols and alkaryl-α - (alkarylcyclohexyl)cyclohexanols of my invention are usually completely hydrocarbon in character except for the alcohol group of the cyclohexanol. The compounds ordinarily have no substituents on the carbon atom of the cyclohexanol substituted by the arylcyclohexyl radical other than said radical as it is essential to have a methylene group (—CH$_2$—) in the starting cyclohexanol upon which the condensation can take place; similarly, one of the α-positions in the cyclohexyl radical of the product is ordinarily unsubstituted, i. e., there is a methylene group still attached to the 1'-carbon atom.

The new compounds of my invention can be represented by the general formula:

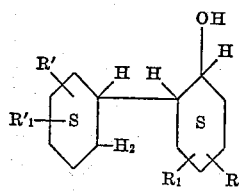

where each of R and R' is one or more substituted or unsubstituted aryl radicals, and each of R$_1$ and R'$_1$ is hydrogen, or aliphatic radicals, or other substitutents in numbers sufficient to complete the saturation of its respective cyclohexyl ring, and S means the ring is saturated.

One of the specific compounds of my invention, 2-phenyl-6-(2'-phenylcyclohexyl)cyclohexanol, can be represented by the formula:

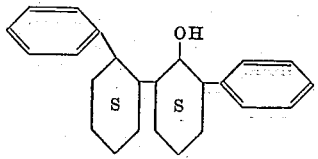

The new compounds of my invention show microbiological activity, for example, against *Aspergillus niger*, and are valuable agricultural fungicides, particularly for tomato wilt prevention. The new compounds are also useful as insect repellents and have a very long-lasting effect because of their low volatility. The compounds are also useful as intermediates in the preparation of secondary plasticizers for resins; the compounds bear a relationship to certain commercial secondary plasticizers for such resins as polyvinyl chloride, in that they have a combination of saturated and unsaturated benzene rings; the alcoholic hydroxy group can easily be removed to increase the similarity and obtain plasticizing compounds.

My procedure for preparing the aryl-α-(arylcyclohexyl)cyclohexanols can be varied considerably from the procedure set forth in the examples. The Guerbet condensation is a well-known procedure for condensing acylic aliphatic alcohols, and any of the known Guerbet conditions can be applied in my condensation of aryl cyclohexanols. As catalysts, any inorganic basic substance can be used, alone, or along with a dehydrogenation catalyst. The term "inorganic basic substance" is used to include salts of organic acids, such as sodium acetate, as well as sodium ethoxide, sodium methoxide, etc., in addition to such inorganic bases as sodium hydroxide, calcium oxide, tripotassium phosphate, etc. Any known dehydrogenation catalyst can be used, although metal and metal oxide catalysts are preferred, e. g., nickel, Raney nickel, palladium, copper, copper chromite, copper oxide, and physical mixtures of any of these materials. The catalysts can be used in any catalytic amount. For example 1 to 20 parts of inorganic basic substance for 100 parts by weight of alcohol is usually suitable, and the dehydrogenation catalyst, if present at all, can be used in similar amounts. From 1 to 5 parts by weight of dehydrogenation catalyst per 100 parts by weight of alcohols is usually suitable.

The reaction temperature can vary greatly, depending on the particular catalyst, reaction time and other factors. Temperatures of 125 to 300° C. can be used, but temperatures of 200 to 300° C. are preferred. The reaction time can vary, e. g., from 5 to 25 hours. The reaction can be conducted at atmospheric pressure, under autogenous pressure, or pressure of various gases, as understood by those skilled in the art. A more complete statement of the known Guerbet catalysts and reaction conditions, all of which are applicable to the present condensation, is set forth in my copending application, Serial No. 541,053, filed October 17, 1955.

A new class of chemical compounds, the aryl-α-(arylcyclohexyl)cyclohexanols has been prepared. A method of preparing these compounds by the condensation of arylcyclohexanols has been described.

As many different embodiments of this invention can be made without departing from the scope thereof, it is to be understood that this invention is not to be limited to the specific embodiments described herein.

I claim:

1. As new compounds, aryl-α-(arylcyclohexyl)cyclohexanols in which the aryl radicals are monocyclic and hydrocarbon.

2. As new compounds, x-phenyl-α-(x' - phenylcyclohexyl)sec.-cyclohexanols, x and x' representing corresponding positions upon the two cyclohexyl rings.

3. As new compounds, 2-aryl-6-(2'arylcyclohexyl)cyclohexanols in which the aryl radicals are monocyclic and hydrocarbon.

4. As a new compound, 2-phenyl-6 - (2' - phenylcyclohexyl)cyclohexanol.

References Cited in the file of this patent
UNITED STATES PATENTS 2,139,231    Hentrich et al. _____ Dec. 6, 1938
2,625,571    Pines et al. _____ Jan. 13, 1953

OTHER REFERENCES

Price et al.: Jour. Amer. Chem. Soc., vol. 69 (1940), p. 1160.

Pratt et al.: Jour. Amer. Chem. Soc., vol. 76 (1954), pp. 52–56.